UNITED STATES PATENT OFFICE.

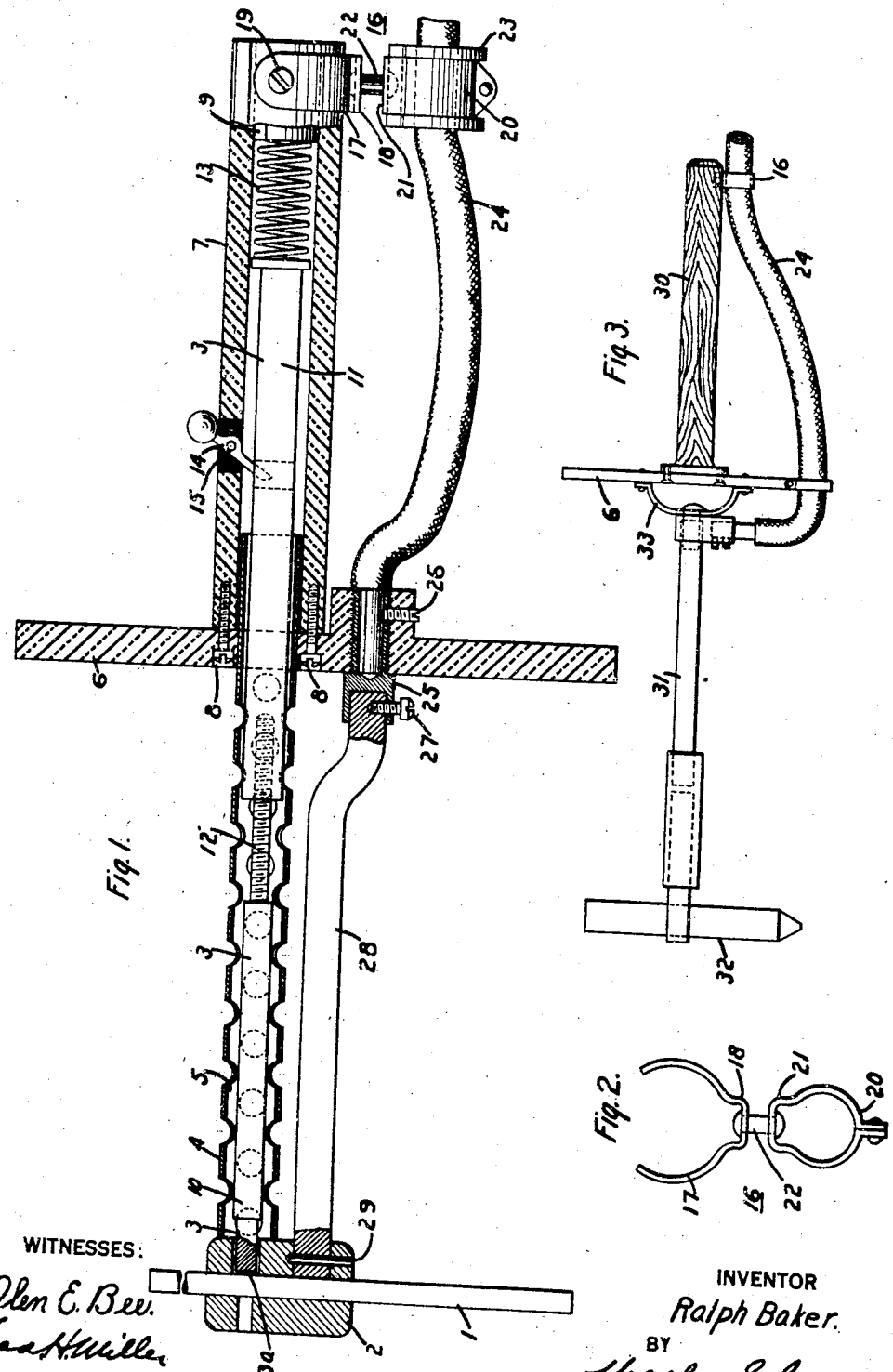

RALPH BAKER, OF WILKINSBURG, PENNSYLVANIA, ASSIGNOR TO WESTINGHOUSE ELECTRIC & MANUFACTURING COMPANY, A CORPORATION OF PENNSYLVANIA.

WELDING-TOOL.

1,303,230.   Specification of Letters Patent.   Patented May 13, 1919.

Application filed November 3, 1917. Serial No. 200,041.

*To all whom it may concern:*

Be it known that I, RALPH BAKER, a citizen of the United States, and a resident of Wilkinsburg, in the county of Allegheny and State of Pennsylvania, have invented a new and useful Improvement in Welding-Tools, of which the following is a specification.

My invention relates to welding tools and particularly to means for preventing the heating of the handles thereof.

The object of my invention is to provide a tool, of the above indicated character, that shall be simple and inexpensive in construction and adapted for continuous operation, for long periods of time, without inconvenience to the operator, by reason of the heating of the handle.

Heating of the handles is, in many instances, the result of two causes, one of which, namely, the heat given off by the arcs, appears to have been recognized and guarded against. In tools, in which the leading-in conductors extend through the handles, another great source of heating is found. The leading-in wires generate heat independently of the arcs and these two sources, combined, so heat the handles, in comparatively short spaces of time, that they cannot be handled even with the aid of gloves.

In practising my invention I provide a welding tool that is so constructed as to protect the handle thereof from the heat caused by radiation and conduction from the arc, and that has the leading-in current conductor so supported from the handle that the heat generated in the conductor is not conveyed to the same.

Figure 1 of the accompanying drawings is a side view, partly in elevation and partly in section, of a welding tool embodying my invention, Fig. 2 is an end detail view of the swivel supporting member shown in Fig. 1, and Fig. 3 is a side elevational view of another form of welding tool embodying my invention.

In Fig. 1 an electrode 1, of steel or other suitable welding material, and which in this modification may comprise a member called a filler-rod is adapted to be held in a longitudinal opening in a relatively long electrode holder 2 by a spring-pressed rod 3. The electrode holder 2, that is preferably constructed of brass, is supported at one end of a member 4 that comprises a hollow perforated metallic tube which is lined with a heat resisting member 5 having perforations that register with the perforations in the member 4. The other end of the member 4 extends through a shield 6, that is formed of a heat-resisting material, such as asbestos, and into one end of a hollow handle 7, of "micarta" or other suitable heat-insulating material. The handle 7 is attached to the shield 6 by screws 8 and is closed at its outer end by a plug 9.

The rod 3 comprises sections 10 and 11, respectively of metal and micarta that are joined by a screw threaded section 12. This arrangement provides a metal clamping end for the rod 3 at the point at which it abuts the hot electrode and a heat insulating section at its portion that extends into the handle 7. The electrode-engaging end face of the rod 3 is cupped, as shown at 3ª, thereby providing a sharp gripping means that is adapted to cut into the electrode to securely hold the latter in position, thus preventing withdrawal of the same when it becomes frozen to the work. A spring 13, acting between one end of the rod 3 and plug 9, actuates the rod 3 to hold the electrode 1 in the holder 2 and is, by its position and its surrounding insulating materials, completely isolated from the sources of heat. A lever 14, that is pivoted in the handle wall on a pin 15, is adapted to permit the withdrawal of the rod 3 from engagement with the electrode.

A swivel supporting device 16 depends from the handle 7 adjacent the plug 9 and comprises a strap-metal member 17 having a depending portion 18 and screws 19 for securing the same to the handle. Fig. 2 gives a clearer conception of the device 16 that further comprises a strap-metal ring 20 having an offset portion 21. The portions 18 and 21 are similar and each provided with concentric apertures through which they are loosely connected by a double-headed pin 22. The ring 20 is adapted to support an insulating bushing 23, through which the current-supplying conductor 24 extends. The conductor 24 extends from the bushing 23 to, and into, one end of a terminal bushing 25 that is screwed into the shield 6. The bushing 25 is provided with a screw 26 by which it is secured to the conductor 24 and a screw 27 by which it is secured to one end of a rigid aluminum conductor 28. The other end of the conductor 28 is secured to the holder 2 by a pin 29.

In operation, one terminal of a suitable supply-circuit (not shown) is attached to the article to be welded and the other terminal is connected to the conductor 24. An arc is then struck between the electrode 1 and the article to be welded, at the point at which the welding operation is to be performed. This causes the material of the electrode or filler-rod to melt and be thereby permitted to drop into a crevice to be filled or a fracture to be repaired. During this operation, heat is generated both at the arc and in the leading-in conductor. This heat is prevented from reaching the handle by the arrangement and composition of the parts as shown in Fig. 1, and thereby permits the continuance of the operation over a long period of time. Renewal of the electrode 1 may be effected by pressing against the lever 14 to disengage the rod 3 from the electrode which may thus be withdrawn and a new one inserted.

By reason of the length of the holder 2, a long and rigid bearing surface for the electrode is provided that gives long life to the device and prevents arcing and consequent burning of the holder where it engages the electrode.

The novel arrangement of the leading-in conductor and shield may be embodied in a carbon-pencil welding tool, as shown in Fig. 3, in which a solid wood handle 30 is attached to a shield 6. A supporting rod 31 for the carbon-pencil 32 is spaced from and supported by the shield 6 through a bracket 33.

The operation and electrical connections of this form of tool are similar to those of the former with the exception that the electrode 32 is used only to strike and maintain the arc. The welding material, or filler-rod, in this instance, is a separate member, one end of which is inserted in the arc.

By the novel correlation of materials, considered from the standpoints of properties, disposition and construction, a highly efficient welding tool is obtained that is protected against both arc heat and leading-in conductor heat and that may be thereby continuously operated for long periods of time.

While I have shown and described particular forms of my invention, many changes may be effected therein within the spirit and scope of the same, as set forth in the appended claims.

I claim as my invention:

1. In a welding tool, the combination with an electrode holder and a supporting member therefor, of a heat-resisting handle for the supporting member, a conductor adapted to lead current to the holder, and means for supporting the conductor in a position spaced from and substantially parallel to the handle, comprising a movable supporting member depending from the handle.

2. In a welding tool, the combination with an electrode holder and a supporting member therefor, of a heat-resisting handle for the holder, a conductor adapted to lead current to the supporting member, and means for supporting the conductor in a position spaced from and substantially parallel to the handle, comprising a supporting member having a swivel connection to the handle.

3. In a welding tool, the combination with an electrode holder and a supporting member therefor, of a heat-resisting handle for the supporting member, a shield between the handle and the supporting member, a conductor adapted to lead current to the holder, and means for supporting the conductor in a position spaced from and substantially parallel to the handle, comprising a movable supporting member associated with the handle and a connector associated with the shield.

4. In a welding tool, the combination with an electrode holder and a hollow supporting member for the holder of a hollow heat-resisting handle for the supporting member, and means movable in both the handle and the supporting member for engaging the electrode comprising a rod of part insulating and part conducting material.

5. In a welding tool, the combination with an electrode holder and a hollow supporting member for the holder of a hollow heat-resisting handle for the supporting member, and means movable in both the handle and the supporting member for engaging the electrode comprising a rod that is composed of insulating material for a part of its length adjacent the handle and of conducting material for the remainder of its length.

6. In a welding tool, the combination with an electrode holder and a hollow supporting member for the holder of a hollow heat-resisting handle for the supporting member, and means movable in both the handle and the supporting member for holding the electrode in operative position comprising a rod having one conducting and one insulating end.

7. A supporting member for an electrode holder comprising concentric cylinders of conducting and insulating material having concentric perforations in their respective walls for the purpose of preventing the conducting and convecting of heat away from the electrode along the supporting member.

8. A welding tool comprising an electrode holder, a hollow perforated heat insulated supporting member for the electrode holder, a hollow heat resisting handle for the supporting member, a heat-resisting shield positioned between the electrode supporting member and the handle, a rod for holding the electrode in position that extends through the supporting member and partly through the handle and is composed of conducting material at its end adjacent the electrode and of insulating material at its opposite end, and means for supporting a conductor outside the handle and the supporting member to supply current to the electrode, the arrangement and properties of the different elements being so related as to prevent the heating of the handle either by conduction or convection of arc heat or by heat generated in the leading-in conductor.

In testimony whereof, I have hereunto subscribed my name this 27th day of Oct. 1917.

RALPH BAKER.